United States Patent [19]

Van Landeghem et al.

[11] 4,059,768

[45] Nov. 22, 1977

[54] RADIOGRAPHIC INTENSIFYING SCREENS

[75] Inventors: Willy Karel Van Landeghem, Sint-Gillis-Waas; André Roger Suys, Kalmthout, both of Belgium

[73] Assignee: AGFA-GEVAERT N.V., Mortsel, Belgium

[21] Appl. No.: 675,990

[22] Filed: Apr. 12, 1976

[30] Foreign Application Priority Data

Apr. 15, 1975 United Kingdom ............... 15510/75

[51] Int. Cl.$^2$ ................................................ G01J 1/58

[52] U.S. Cl. ........................................ 250/483; 250/486

[58] Field of Search ............... 250/483, 486, 487, 488, 250/361, 368, 213 VT

[56] References Cited

U.S. PATENT DOCUMENTS

| | | | |
|---|---|---|---|
| 2,240,706 | 5/1941 | Law | 250/488 |
| 2,436,182 | 2/1948 | Schmidling | 250/488 |
| 3,769,059 | 10/1973 | Driard et al. | 250/483 X |

*Primary Examiner*—Archie R. Borchelt
*Attorney, Agent, or Firm*—A. W. Breiner

[57] ABSTRACT

Fluorescent X-ray image intensifying screen comprising discrete particles of fluorescent material dispersed in a binder layer which screen has an outer layer containing solid particulate material protruding from a coherent film forming organic binder medium and having a static friction coefficient at room temperature not higher than 0.30 on steel.

15 Claims, 1 Drawing Figure

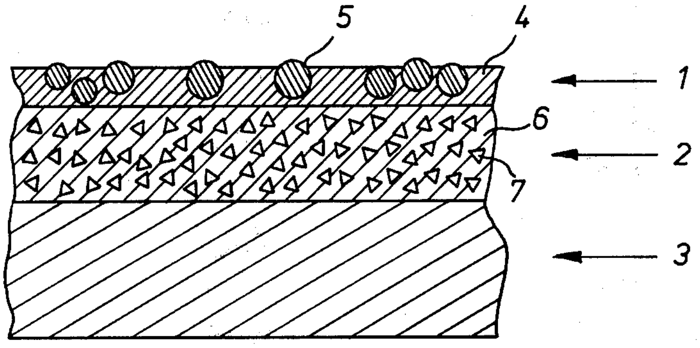
5
4
1
6
2
7
3

RADIOGRAPHIC INTENSIFYING SCREENS

The present invention relates to fluorescent X-ray image intensifying screens having a coating comprising substances reducing friction.

Intensifying screens containing fluorescent substances are employed to increase the exposure of a photosensitive plate or film without increasing the X-ray exposure dose when struck by X-rays. These screens are customarily arranged inside a cassette, so that each side of a silver halide film, emulsion-coated on both sides after the cassette has been closed is in intimate contact with an adjacent screen. In exposing the film the X-rays pass through one side of the cassette, through one entire intensifying (front) screen, through the light-sensitive silver halide film emulsion-coated on both sides and strike the fluorescent substances (phosphor particles) of the second (back) intensifying screen. This causes both screens to fluoresce and to emit fluorescent light into their adjacent silver halide emulsion layer, which is inherently sensitive or spectrally sensitized to the light emitted by the screens.

The commonly used fluorescent screens comprise a support and a layer of fluorescent particles dispersed in a coherent film-forming macromolecular binder medium. Normally a protective coating is applied on top of the fluorescent layer in order to shield said layer from ambient influences e.g. moisture, air and mechanical abrasion. Such protective coating may be applied from a solution containing a polymeric material that upon drying forms a coherent layer or alternatively by applying a preformed film of a moisture-impermeable plastic such as polyethylene terephthlate, polymethyl metachrylate, polyvinyl chloride or polyethylene to the fluorescent coating with the aid of a suitable adhesive or by so-called laminating whereby the coating to be protected is moistened with a suitable solvent for the binder followed by applying pressure and optionally also heat.

The thickness of like protective layers ranges commonly between 5 and 25 $\mu$m.

Automatic X-ray devices have been proposed wherein successive light-sensitive sheets are successively fed at a high velocity into position between a pair of X-ray intensifying screens. The feed path of the light-sensitive sheets changes direction rather abruptly near the entrance to the space between the screens. After a certain film sheet throughput, line drop-outs have been observed in the exposed and developed film in the direction of film movement. These drop-outs, which are in the form of elongated transparent specks on the processed film impair the image quality. In medical radiography they impede unquestionable medical diagnosis.

It has been found that said drop-outs are caused by collection of particles present on the surface of the screens. Such particles are the result of friction. The particles often of elongate form, constitute dust which strongly adhere to the screens due to the pressure exerted during the sandwiching of the successive film sheets between the screens.

The high friction which occurs during the introduction of the film sheets between the screens can induce such high potential differences that static electricity produces undesired exposure by sparking.

It is an object of the present invention to provide an intensifying screen having characteristics which enable it to be used in high speed machines as above referred to with less risk of dust formation and resultant impairment of the radiographic images.

In order to accomplish the above object, the fluorescent X-ray image intensifying screen according to the present invention has an outermost layer containing solid particulate material protruding from a coherent film-forming organic binder medium, and having a static friction coefficient ($\mu$) at room temperature (20° C) not higher than 0.50 on steel.

Advantageously, the raised or relief portions of the screen face have rounded crests, i.e., crests which are outwardly convex. A "pebbled" surface configuration is an example. However, the individual raised portions need not be of substantially equal dimensions in all directions measured along the screen face. Some or all of the raised portions may be elongate. For example such portions may be formed by distributed elongated particles, fibres or treads.

Preferably the whole face is densely populated with said raised portions.

The surface roughness of the screen face, i.e. the depth of the unevennesses, may be determined with a PERTH-O-METER (ref. Dr. Perthen, Hannover/-Hommel-Werke, Mannheim). It is expressed by the sum of two terms, namely W + Rt wherein W (Welligkeit) is the depth measure for the macro-unevennesses of the surface and Rt is the depth measure of the micro-unevennesses of the surface. "Macro-unevenness" here refers to the deviations of the general surface contour from a plane and "micro-unevenness" refers to the surface irregularities which are present locally in successive parts of the surface contour.

Preferably the relief configuration of said screen face is characterized by micro-unevennesses of at least 3 $\mu$m. Preferably said micro-unevennesses are in the range of 5 to 10 $\mu$m.

The outermost layer preferably contains per 0.25 sq.cm at least 9 micro-unevennesses i.e. at least 9 protruding particles.

The coefficient of friction between two surfaces is the ratio of the force required to move one surface over the other to the total force pressing the two surfaces together. If F is the force required to move one surface over another and W the force pressing the surfaces together, the coefficient of friction $\mu = F/W$ (see Handbook of Chemistry and Physics — 42nd Ed. Editor in chief charter D. Hodgman published by the Chemical Rubber Publishing Co. Cleveland, Ohio — p.2163).

Solid substances that have a static friction coefficient ($\mu$) not higher than 0.5 on steel and that are photographically inert towards a silver halide emulsion layer are e.g. polymethylmethacrylate ($\mu$=0.4 to 0.5) polystyrene and styrene copolymers ($\mu$= 0.3 to 0.35) and polymers of the group of solid polyalkylenes e.g. polyethylene ($\mu$=0.2) and polypropylene and solid organic fluorinated polymers. These polymers may be used in admixture or as copolymers containing repeating alkylene units and organic fluorinated repeating units.

Solid fluorinated polymers useful according to the present invention in said outermost layer, which is actually an antifriction covering layer, are characterized by the presence of repeating units of at least one of the following formulae:

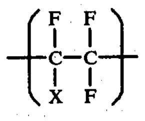

or

I.

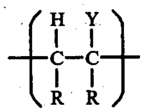

II.

wherein:

X represents chlorine or fluorine,

R represents a member selected from the group consisting of hydrogen and alkyl groups having 1 to about 4 carbon atoms and Y represents a moiety having one of the following formulae:

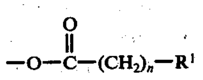

(A)

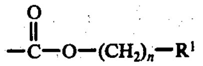

(B)

wherein *n* is 0 or 1 and $R^1$ is a fluorinated alkyl, including branched and straight chain alkyls as well as fluoroalkoxy-substituted fluorinated alkyls, having one to about 20 carbon atoms.

The static friction coefficient of the raised portions or protruding particulate material of the outermost antifriction covering layer is preferably less than 0.3.

A particularly useful solid fluorinated organic polymer is polytetrafluorethylene which on steel has a static friction coefficient of 0.04.

Other solid fluorinated polymers useful in the present invention are characterized by the presence of at least one repeating unit in the polymer having formula II shown hereinabove. Typically, these fluorinated polymers, whether homopolymers or copolymers, have a fluorine content of preferably at least about 40% based on the total molecular weight of the polymer. These polymers are solid at room temperature (i.e. 20° C) at a pressure of 1 atmosphere. Best results have generally been obtained in accord with the invention wherein $R^1$ of formula (A) and (B) above contains a perfluorinated terminal carbon atom, i.e. $-CF_3$.

Such polymers have repeating units shown hereinbelow under (1) to (5):

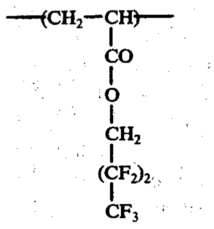

(1)

-continued

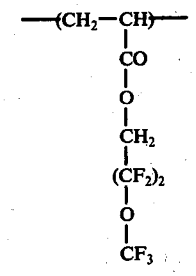

(2)

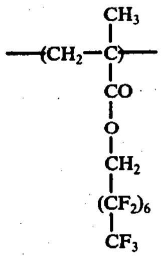

(3)

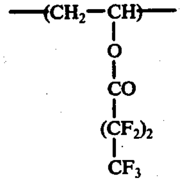

(4)

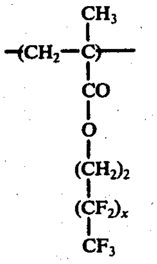

(5)

wherein *x* is an integer of 1 to about 18.

As indicated above both fluorinated homopolymers and copolymers may be used as the solid fluorinated polymer in the present invention. For example, copolymers containing two or more different repeating units such as those shown in formulae (I) and (1)–(5) above may be used. Alternatively, copolymers containing both fluorinated repeating units such as those described above and non-fluorinated units, for example, repeating units of alkyl acrylates and methacrylates such as methyl methacrylate, may be employed. Typically, the solid fluorinated polymers used in the present invention contain at least about 30 repeating units.

Solid fluorinated polymers suitable for use in the present invention are readily available commercially and accordingly description of their preparation is deemed unnecessary. These materials are available under a variety of trade names from numerous chemical suppliers. Exemplary of useful commercially available materials are the following polytetrafluorethylene sold under the trade name TEFLON by E. I. duPont de Nemours & Co. (Inc.) U.S.A., poly(1,1-dihydroperfluorobutyl acrylate) and poly (3-perfluoromethoxy-1,1-dihydroperfluoropropyl acrylate) sold by Minnesota Mining and Manufacturing Co., NYEBAR Type C fluoro polymers sold by William F. Nye Inc. Co., and fluoropolymers sold by E. I. duPont de Nemours & Co. (Inc.), under the trade name ZEPEL 2979 polymers and TLF-2916 Fabric fluoridizer polymers. If additional information is desired concerning the preparation and manufacture of materials representative of the above-described solid fluorinated polymers, reference may be made to U.S. Pat. No. 2,592,069 of Thomas S. Reid issued Apr. 8, 1952 and U.S. Pat. No. 2,642,416 of Arthur H. Ahlbrecht, Thomas S. Reid and Donald R. Husted, issued June 16, 1953.

In accordance with a preferred embodiment of the present invention, the raised portions are formed by particulate material, preferably fluorinated polymer particles, which are held by a film-forming binder medium that is applied as a top coat to the fluorescent layer of the screen. The binder resin provides moisture resistance toughness and abrasion resistance to the resultant composition. In addition, the binder resin, especially one selected from the preferred class of binder resins described hereinbelow, significantly reduces the amount of the more expensive solid fluorinated polymer used according to the present invention. In general, the resinous binder may be any film-forming (preferably hydrophobic polymeric material photographically inert towards a silver halide emulsion layer. Materials of this type include e.g. cellulose derivatives e.g. cellulose nitrate, cellulose triacetate, cellulose acetate propionate, cellulose acetate butyrate, polyamides, polystyrene, polyvinyl acetate, polyvinyl chloride, silicone resins, poly (acrylic ester) and poly(methacrylic ester) resins, and fluorinated hydrocarbon resins, and mixtures of the foregoing materials. Representative examples of various individual members of these binder materials include the following resinous materials: poly(methyl methacrylate), poly(n-butyl methacrylate), poly(isobutyl methacrylate), copolymers of n-butyl methacrylate and isobutyl methacrylate, copolymers of vinylidene fluoride and hexafluoropropylene, copolymers of vinylidene fluoride and trifluorochloroethylene, copolymers of vinylidene fluoride and tetrafluoroethylene, terpolymers of vinylidene fluoride, hexafluoropropylene and tetrafluoroethylene, and poly(vinylidene fluoride).

The above mentioned cellulose derivatives and polyamides are especially preferred for use as the binder resin in the anti-friction layer compositions applied in the invention.

The amoumt of a binder resin employed in the anti-friction layer composition may vary considerably. The resinous binder may be present in an amount varying from about 10 to about 95 percent by weight of the anti-friction layer composition. Typically, if the resinous binder component is not one of the fluorinated hydrocarbon resinous binders indicated hereinabove, the amount thereof, which may be advantageously utilized in the present invention, is preferably within the range of from about 50 to about 80 percent by weight of the layer composition.

Such materials as those indicated immediately above have been described in the prior art and are commercially available from a number of manufacturers.

In accord with an embodiment of the invention inert, solid, particulate anti-friction powder, e.g. particulate fluorocarbon material sold as HOSTAFLON TF-BP 9205 (trade name of Farbwerke Hoechst AG, Frankfurt/M., W. Germany for a poly(tetrafluorethylene) of average particle size of 5–7 $\mu$m) or FLUON L 169 B (trade name of Imperial Chemical Industries Ltd., London for a poly(tetrafluorethylene) of average particle size of 5 $\mu$m) is incorporated in the anti-friction layer compositions of the invention in amounts up to about 60 percent by weight, preferably from 20 to about 50 percent by weight, based on the total dry weight of the coating. The particulate fluorocarbon powder acts as a strong antiadhesive material. This material uniformly distributed and protruding from the coating composition retains its particulate form within the coating composition and appears as discrete, finely-divided particles.

The preferred average particle size of the solid particulate material is between about 5 and about 25 micrometer (micron).

The outermost anti-friction layer is preferably prepared by coating a dispersion of said particulate material having a low friction coefficient in an organic solvent solutive of a film-forming organic polymeric binder. The organic solvent is allowed to evaporate whereby a solid layer having a plurality of fixed protruding particles of low friction coefficient is obtained.

In order to allow said particles to protrude the coating thickness of a solvent coated layer during coating is kept at such magnitude that the thickness of the continuous binder medium part of the dried outermost layer is less than the average diameter of the particulate material used. For example, the continuous binder medium part of the dried coated layer has a thickness of 5 $\mu$m when the anti-friction particulate material has an average diameter of 8 $\mu$m.

The relief structure having relief variations in the preferred order of 5 to 10 $\mu$m is suited to retain minute but effectively operating amounts of anti-static substances, which by the presence of the surface relief are not easily wiped out so that a long lasting antistatic character is obtained. The antistatic substances are preferably applied from a spray that is commercially available for that purpose. For example the spray "ANTI-STAT" 6, which leaves an odourless transparent antistatic deposit, is used. ANTI-STAT is a trade name of Braun Laboratories Div. Barrett Chemical Co. Inc., Philadelphia, Pa., U.S.A.

The surface roughness of the anti-friction covering layer is in correlation with the desired image sharpness of the processed films.

The fluoresent layer to which the anti-friction layer is applied may comprise any of the phosphor substances commonly employed for the purpose. Obviously, these substances are elected in view of their use in combination with a particular photographic silver halide material and should have light-emitting properties which match as close as possible the light-sensitivity characteristics of the photographic silver halide emulsion employed in the manufacture of the radiographic film.

In the manufacture of the screens the phosphor particles are dispersed in a solution of a binder or binder mixture. The dispersion may be coated on a permanent support e.g. cardboard or resin sheet or may be coated on a temporary support to form a self-supporting sheet later on. The solvent(s) used in the preparation of the coating composition is (are) normally evaporated under reduced pressure. An ultrasonic treatment may be applied to improve the packing density and to perform the de-aeration of the phosphor-binder combination. Before the application of the protective coating the phosphor-binder layer may be calendered to improve the packing density (i.e. grams of phosphor per $cm^3$ of dry coating).

Self-supporting screens of this invention may also be realised by means of "hot-pressing" excluding hereby the use of solvent(*s*) in the manufacture of the screens.

To provide the high X-ray efficiency it is preferable that a minimum amount of binder be employed in the fluorescent layer. However, the less binding agent the more brittle the layer, so that a compromise has to be made. The thicker the fluorescent layer of a screen the higher its intensification, but the sharpness is decreased accordingly so that a balance between speed and definition is chosen.

Optionally, a light-reflecting layer is present between the fluorescent layer and its support in order to enhance the exposure of the silver halide emulsion material.

The fluorescent X-ray image intensifying screens can emit in a wide spectral range and, depending upon the particular phosphor employed, they can have, e.g., a substantial part, that is, more than half of their spectral emission, in a wavelength range shorter than about 410 nm. Phosphors suited for that purpose are, e.g. lead barium sulphate, gadolinium-activated yttrium oxide, lanthanide- or lead-activated strontium sulphate or various mixed alkaline earth phosphors such as barium strontium sulphate, and europium-activated barium strontium sulphate. Said phosphors can be prepared by a number of ways such as set forth in Belgian Pat. No. 703,988, filed Sept. 18, 1967 by Badische Anilin und Soda-Fabrik A.G., by Buchanan et al. in J. Appl. Phys. 39 (1968) 4342–4347 and by Clapp and Gunther in J. Opt. Soc. Am. 37 (1947) 355–362.

Particularly useful screens contain calcium tungstate as phosphor or a phosphor or a phosphor mixture consisting wholly or mainly of a rare earth metal-activated lanthanum oxyhalide, said phosphor or phosphor mixture having more than half its spectral emission above 410 nm, more than half its spectral emission of visible light between 400 and 500 nm, and its maximum of emission in the wavelength range of 400–450 nm. Preferred phosphors of that class correspond to one of the following general formulae:

$$La_{(1-n)}Tb_n^{3+}OX$$

wherein X is halogen such as e.g. chlorine, bromine or fluorine $Tb^{3+}$ is trivalent terbium, and $n$ is from 0.006 to 0.0001 the halogen is preferably present in the range of between about the stoichiometric amount and about 2.5 percent thereof; or $$La_{(1-w-y)}OX : Tb_w Yb_y$$

wherein

X is chlorine or bromine $w$ is from 0.0005 to 0.006 mole of the oxyhalide and $y$ is from 0.00005 to 0.005 per mole of the oxyhalide.

Cerium may replace lanthanum in an amount described in U.K. Pat. No. 1,247,602 filed Oct. 9, 1969 by General Electric and Co.

The preparation of terbium-activated lanthanum oxychloride and lanthanum oxybromide phosphors is described e.g. in U.K. Pat. No. 1,247,602 already mentioned hereinbefore, French Pat. Nos. 2,021,398 and 2,021,399 both filed Oct. 23, 1969 by General Electric and Co, and published German patent application (DOS) Nos. 1,952,812 filed Oct. 21, 1969 and 2,161,958 filed Dec. 14, 1971 both by General Electric and Co. Suitable lanthanum oxychloride-fluoride phosphors are described in the published German patent application (DOS) No. 2,329,396 filed June 8, 1973 by Siemens A. G.

The preparation of lanthanum oxyhalides activated with terbium and ytterbium is described, e.g., in published German patent application (DOS) No. 2,161,958 already mentioned hereinbefore.

An ultraviolet-emitting phosphor is barium fluorochloride activated with europium(III) as described in French Pat. No. 2,185,667 filed May 23, 1973 by Philips' Gloeilampenfabrieken N. V.

Other phosphors that are likewise particularly suited for use in the intensifying screens of the present invention are represented by the following general formula:

$$M_{(w-n)} \cdot M'_n O_w X$$

wherein:

M is at least one of the metals yttrium, lanthanum, gadolinium, and lutetium,

M' is at least one of the rare metals dysprosium, erbium, europium, holmium, neodymium, praseodymium, samarium, terbium, thullium and yttrium, X is sulphur or halogen, $n$ is from 0.0002 to 0.2, and $w$ is 1 when X is halogen or is 2 when X is sulphur.

Many of the phosphors represented by this general formula have an emission in the green part of the visible spectrum with emission peaks at about 490 nm and about 540 nm and are prepared according the descriptions in French Pat. No. 1,580,544 filed July 25, 1968 by N. V. Philips' Gloeilampenfabrieken, U.S. Pat. Nos. 3,418,246 of Martin R. Royce issued Dec. 24, 1968 and 3,418,247 of Perry N. Yocom issued Dec. 24, 1968 and U.K. Pat. No. 1,247,602 already mentioned hereinbefore.

Another phosphor emitting in a range higher than 500 nm with emission maximum between 530 and 630 nm suited for use in a screen material of the present invention is represented by the following general formula:

$$M_{(2-x)}A_2O_2S$$

wherein M is yttrium, $x$ is between 0.002 and 0.2 and A is terbium. Phosphors according to this general formula are described, e.g. in U.K. Pat. No. 1,206,198 filed Mar. 28, 1968 by N. V. Philips' Gloeilampenfabrieken.

The particle size of the phosphors used in the present invention is preferably between 0.1 $\mu$m and about 20 $\mu$m more preferably between 1 $\mu$m and 12 $\mu$m whereby this range embodies about 80% by volume of the phosphor present in the said screen.

The thickness of the supported fluorescent layer may vary within a broad range but is preferably in the range of 0.05 to 0.5 mm.

The coverage of the phosphors is e.g. in the range from about 200 to 800 g/sq.m and preferably from about 300 to 600 g/sq.m.

The image sharpness obtainable with a fluorescent screen-silver halide material system can be improved considerably by incorporating a fluorescent light-absorbing dye called here "screening dye" into the fluorescent screen material, e.g. in the fluorescent layer or into a layer adjacent thereto e.g. in a subjacent anti-reflection layer. As the oblique radiation covers a large path in the screen material it is attenuated by the screening dye or dyes to a greater extent than the radiation impinging normally. The term "screening dye" includes here dyestuffs (i.e. coloured substances in molecularly divided form) as well as pigments.

Diffuse radiation reflecting from the support of the fluorescent screen material is mainly attenuated in an antireflection layer containing the screening dyes subjacent to the fluorescent layer.

The screening dye has not to be removed from the fluorescent screen material and therefore may be any dye or pigment absorbing in the emission spectrum of the fluorescent substance(s). Thus a black substance such as carbon black incorporated in said anti-reflection layer of the screen material yields quite satisfactory results.

The screening dye(s) is (are) preferably used in the fluorescent layer e.g. in an amount of at least 0.5 mg per sq.m. Their amount in the anti-reflection layer, however, is not limited.

An appropriate screening dye for use in the fluorescent screens emitting in the green part (500–600 nm) of the visible spectrum is, e.g., Neozapon Fire Red (C. I. Solvent Red 119), an azochromium rhodamine complex. Other suitable screening dyes are C.I. Solvent Red 8, 25, 30, 31, 32, 35, 71, 98, 99, 100, 102, 109, 110, 118, 124 and 130.

The non-self-supporting phosphor-binder composition may be coated on a wide variety of supports e.g. cardboard and plastic film e.g. polyethylene terephthalate film. The supports used in the fluorescent screens of the present invention may be coated with (a) subbing layer(s) for improving the adherence of the fluorescent coating thereto.

The screens of the present invention may be used in conjunction with light-sensitive silver halide materials emulsion-coated on one or both sides of the support.

The single FIGURE of the drawing is illustrative of an embodiment of the invention.

The following examples illustrate the present invention without, however, limiting it thereto.

EXAMPLE 1

Screen A (as illustrated in the drawing)

In a solution of 100 g of cellulose acetate butyrate binder 4 in 900 g of ethylene glycol monomethyl ether, 25 g of polytetrafluorethylene particles 5 having an average grain size of between 5 and 8 $\mu m$ were dispersed in a ball-mill for 16 *h*. The dispersion was diluted up to 5% by weight of solids, was subsequently filtered and de-aerated. Said dispersion was immersion-coated on a supported phosphor screen layer and dried. The average thickness of the dried anti-friction layer 1 was 7 $\mu m$.

The phosphor screen layer 2 was applied to the support 3 at a coverage of 50 mg per sq.cm of lanthanum oxybromide activated with terbium in a phosphor-binder weight ratio of 92.5/7.5. The binder 6 of the phosphor layer was polyethyl acrylate dissolved for coating purposes in ethyl acetate. The phosphor particles 7 were dispersed in said binder with the aid of 0.5% by weight of GAFAC RM-710 with respect to the phosphor. GAFAC is a trade-name of Antara-Gen. Aniline (see Chem. & Eng. News 40 (1962) No. 16 p. 87). GAFAC RM-710 is a mixture of:

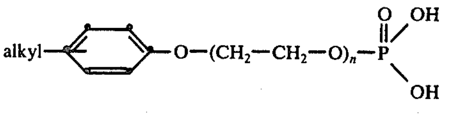

-continued and

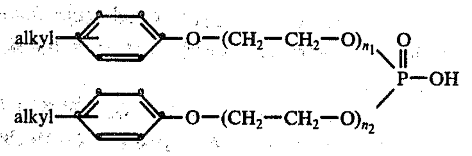

n = 15 to 20
$n_1 + n_2$ = 15 to 20
alkyl = C15 to C20

Screen B

Screen B was like screen A with the difference, however, that it contained no polytetrafluoroethylene. 210 sheets (7 loaders of 30 sheets) of CURIX RP 1 Medical X-ray film (trade name of the Applicant) were introduced at 6 film sheets per *s* into a Cut Film Changer Type AOT-R, apparatus marketed by Elema-Schonander, Fack, Solna, Sweden and provided with 2 screens B and uniformly exposed with X-rays from an X-ray source operating at 80 kV at a distance of 100 cm. After development it was noted that the films show gradually increasing deterioration in the form of small transparent specks having an elongated form in the direction of the film movement between the intensifying screens.

When a same amount of this same kind of film is introduced under the same conditions between two screens A, no deterioration as described above was detected.

EXAMPLE 2

Example 1 was repeated with the difference that 100 g of polytetrafluorethylene was used instead of 25 g. This screen being referred to as screen C showed similarly good results as mentioned in connection with screen A.

EXAMPLE 3

Example 1 was repeated with the difference, however, that the protective coating was applied from a composition prepared as follows: 20 g of cellulose acetate butyrate are dissolved in 180 g of ethylene glycol monomethyl ether. To the obtained solution 20 g of polyethylene ($\mu$=0.2) particles (average grain size 12 $\mu m$) density: 0.99, average molecular weight: 3000) were added and dispersed in a ball-mill for 16 *h*. Thereupon the dispersion was diluted with ethylene glycol monomethyl ether up to a 10% by weight content of solids. Said composition was coated to the phosphor-binder layer in such a way that the average thickness of the dried protective antifriction layer was 10 $\mu m$.

EXAMPLE 4

Example 3 was repeated but instead of polyethylene particles polystyrene ($\mu$ = 0.33) particles having an average grain size of 15 $\mu m$ and density = 1.051 were used.

We claim:

1. Fluorescent X-ray image intensifying screen comprising discrete particles of fluorescent material dispersed in a binder layer which screen has an outermost layer overlaying said binder layer containing solid particulate material protruding from a coherent film-forming organic binder medium and having a static friction coefficient at room temperature not higher than 0.50 on steel.

2. The screen according to claim 1, wherein the said outermost layer is characterized by micro-unevennesses of at least 3 μm.

3. The screen according to claim 1, wherein said outermost layer exhibits at least 9 protruding particles per 0.25 sq.cm.

4. The screen according to claim 1, wherein the static friction coefficient of the protruding particles is less than 0.3.

5. The screen according to claim 1, wherein said protruding particles are made of a member of the group consisting of solid polystyrene, solid polyalkylene and a solid organic fluorinated polymer.

6. The screen according to claim 5, wherein the solid fluorinated polymer is characterized by the presence of repeating units of at least one of the following formulae:

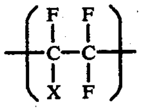
I.

and

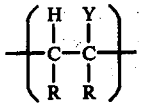
II.

wherein:

X represents a member of the group consisting of chlorine and fluorine,

R represents a member selected from the group consisting of hydrogen and alkyl groups having 1 to about 4 carbon atoms, and Y represents a moiety having one of the following formulae:

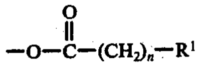
(A)

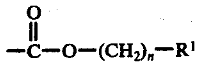
(B)

wherein $n$ is 0 or 1 and $R^1$ is a fluorinated alkyl, including branched and straight chain alkyls as well as fluoroalkoxy-substituted fluorinated alkyls, having 1 to about 20 carbon atoms.

7. The screens according to claim 6, wherein the solid fluorinated polymer is polytetrafluoroethylene.

8. The screen according to claim 1, wherein the particulate material has an average particle size of between about 5 and about 25 μm.

9. The screen according to claim 1, wherein the particulate material is fixed with a film-forming binder resin of the group of cellulose nitrate, cellulose acetate, cellulose acetate propionate, cellulose acetate butyrate and polyamides.

10. The screen according to claim 9, wherein binder resin is present in said outermost layer in an amount varying from about 10 to about 95 percent by weight.

11. The screen according to claim 10, wherein the particulate material is present in the outermost layer in an amount from about 20 to about 50 percent by weight.

12. The screen according to claim 1, wherein the thickness of the coherent binder medium part of the dried outermost layer is less than the average diameter of the particulate material.

13. The screen according to claim 1, wherein the outermost layer is present on a fluorescent layer supported by a cardboard.

14. The screen according to claim 1, wherein the outermost layer is present on at least one side of a fluorescent layer that is self-supporting.

15. The screen according to claim 1, wherein the outermost layer is present on a fluorescent layer supported by a resin sheet.

* * * * *